United States Patent
Viti (10) Patent No.: US 7,235,939 B2
(45) Date of Patent: Jun. 26, 2007

(54) METHOD FOR DETECTING THE ANGULAR POSITION OF A ROTOR IN A BRUSHLESS ELECTRIC MOTOR

(75) Inventor: Marco Viti, Cornaredo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 150 days.

(21) Appl. No.: 10/721,766

(22) Filed: Nov. 25, 2003

(65) Prior Publication Data

US 2004/0154411 A1    Aug. 12, 2004

(30) Foreign Application Priority Data

Nov. 28, 2002   (EP)   .................................. 02425725

(51) Int. Cl.
*H02K 21/02* (2006.01)
(52) U.S. Cl. ..................................................... 318/254
(58) Field of Classification Search ................ 318/459, 318/439, 254, 701, 811, 705, 430
See application file for complete search history.

(56) References Cited

U.S. PATENT DOCUMENTS

| | | | | |
|---|---|---|---|---|
| 4,376,970 A * | 3/1983 | Ilseman et al. | ................ | 700/56 |
| 4,492,903 A | 1/1985 | Knight et al. | ................ | 318/341 |
| 4,752,724 A * | 6/1988 | Radziwill et al. | ........... | 318/254 |
| 4,874,993 A * | 10/1989 | Tanaka et al. | .............. | 318/254 |
| 4,922,169 A * | 5/1990 | Freeman | ..................... | 318/254 |
| 5,130,620 A * | 7/1992 | Inaji et al. | .................. | 318/254 |
| 5,194,794 A * | 3/1993 | Shamoto | ..................... | 318/603 |
| 5,221,881 A * | 6/1993 | Cameron | ..................... | 318/254 |
| 5,306,988 A * | 4/1994 | Carobolante et al. | ........ | 318/254 |
| 5,317,243 A * | 5/1994 | Cameron | ..................... | 318/254 |
| 5,384,527 A * | 1/1995 | Rozman et al. | ............... | 322/10 |
| 5,469,112 A * | 11/1995 | Lee | ............................. | 329/302 |
| 5,506,487 A * | 4/1996 | Young et al. | ............... | 318/811 |
| 5,616,996 A * | 4/1997 | Tang et al. | ................. | 318/439 |
| 5,663,618 A | 9/1997 | Adachi et al. | .............. | 318/254 |
| 5,672,948 A | 9/1997 | Cohen et al. | ............... | 318/603 |
| 5,717,298 A * | 2/1998 | Tang et al. | ................. | 318/254 |
| 5,764,020 A * | 6/1998 | Maiocchi | .................... | 318/705 |
| 5,969,491 A * | 10/1999 | Viti et al. | ................... | 318/254 |
| 6,023,141 A * | 2/2000 | Chalupa | ..................... | 318/439 |
| 6,081,091 A * | 6/2000 | Mitchell et al. | ............. | 318/685 |
| 6,107,763 A * | 8/2000 | Rossi | .......................... | 318/254 |
| 6,163,120 A * | 12/2000 | Menegoli | .................... | 318/254 |
| 6,229,274 B1 * | 5/2001 | Vertemara et al. | .......... | 318/430 |
| 6,242,875 B1 * | 6/2001 | Kusaka et al. | .............. | 318/254 |
| 6,424,106 B2 * | 7/2002 | Gotou et al. | ................ | 318/254 |
| 6,498,446 B1 * | 12/2002 | Menegoli et al. | ........... | 318/254 |
| 6,504,328 B1 * | 1/2003 | Gontowski, Jr. | ............ | 318/254 |

(Continued)

*Primary Examiner*—Lincoln Donovan
*Assistant Examiner*—Robert W. Horn
(74) *Attorney, Agent, or Firm*—Lisa K. Jorgenson; Robert Iannucci; Seed IP Law Group PLLC (57) ABSTRACT

A method for detecting the angular position of a rotor in a brushless electric motor, of the type in which the emission of a polarity signal of the back electromotive force by a detection circuitry associated with the motor, includes the using a bi-directional counter for counting the residence time difference of the logic states '0' and '1' at the output of the detection circuitry. The method is aimed at improving the detection of the instantaneous position of the rotor in a brushless motor through the detection of the zero-crossing signal.

29 Claims, 10 Drawing Sheets

U.S. PATENT DOCUMENTS

| | | | |
|---|---|---|---|
| 6,534,938 B1* | 3/2003 | Wu et al. | 318/254 |
| 6,850,022 B2* | 2/2005 | Liu et al. | 318/439 |
| 6,879,124 B1* | 4/2005 | Jiang et al. | 318/439 |
| 6,979,970 B2* | 12/2005 | Iwanaga et al. | 318/599 |
| 7,071,640 B2* | 7/2006 | Kurosawa et al. | 318/254 |
| 7,106,013 B2* | 9/2006 | Narumi et al. | 318/254 |
| 2004/0070356 A1* | 4/2004 | Masino | 318/439 |
| 2004/0080293 A1* | 4/2004 | Kurosawa et al. | 318/459 |
| 2004/0131342 A1* | 7/2004 | Masino | 388/800 |
| 2004/0135530 A1* | 7/2004 | Liu et al. | 318/439 |
| 2004/0154411 A1* | 8/2004 | Viti | 73/862.325 |
| 2004/0223251 A1* | 11/2004 | Ventura et al. | 360/75 |
| 2004/0250630 A1* | 12/2004 | Yao | 73/862.325 |

\* cited by examiner

METHOD FOR DETECTING THE ANGULAR POSITION OF A ROTOR IN A BRUSHLESS ELECTRIC MOTOR

BACKGROUND OF THE INVENTION

1. Field of the Invention

The present invention relates to a method for detecting the angular position of a rotor in a brushless electric motor. In particular, a motor of the type in which the emission of a polarity signal of the back electromotive force (Bemf) by a detection circuitry associated with the motor is provided.

More specifically, the method is aimed at improving the detection of the instantaneous position of the rotor in a brushless motor through the detection of the zero-crossing signal, known as "zero-crossing", of the back electromotive force (Bemf) produced by the motor itself.

This method can be used in all applications using this type of motor: e.g. Floppy and Hard Disk drive, DVD, CD and Tape drive.

2. Description of the Related Art

As is well-known in this specific field of application, it is common practice to refer to the Bemf signal and to "zero crossing" or "ZC" for the driving of brushless motors.

An example of this methodology is described in U.S. Pat. No. 5,969,491, assigned to STMicroeletronics, Srl, and incorporated herein by reference, in which the windings of the motor are put in a high impedance state for a brief period of time near the ZC occurrence to be detected.

The signal obtained is used as a reference for the measurement of the position and speed of the rotor.

The weak point of such an implementation is given by the fact that such a signal can be affected by electrical noise sources due both to circuit portions which are synchronous with the system for driving the motor, which are generally easier to mask, and to asynchronous circuit portions, which are more difficult to eliminate.

Figure 1:
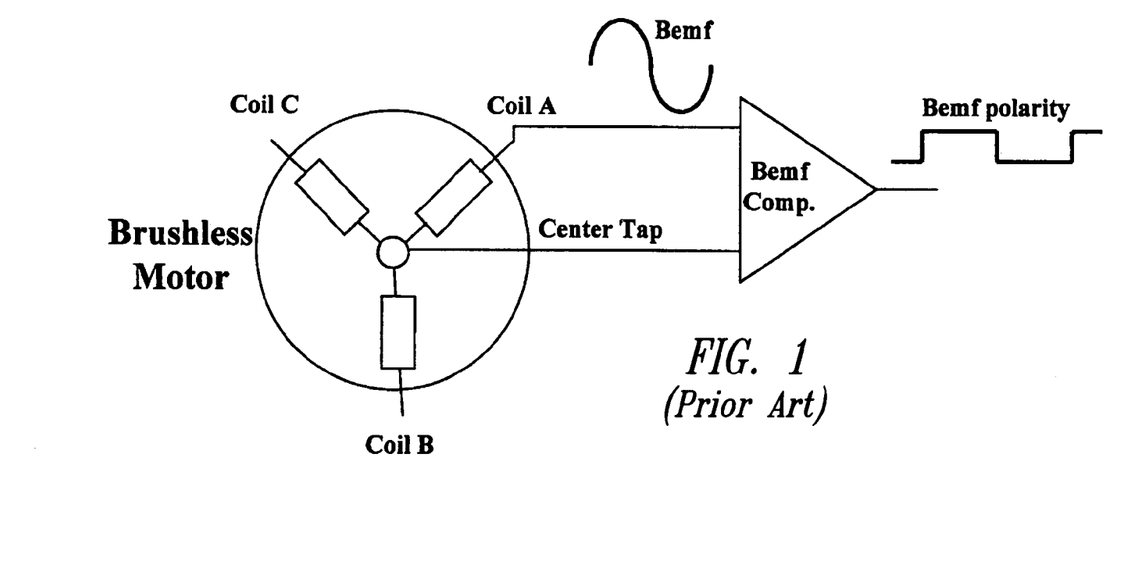
FIG. 1 shows a schematic view of a device for detecting the ZC signal in a brushless motor according to the prior art.

Some of the analog solutions proposed in the prior art provide the insertion of a low-pass filter inputting into the detection circuit of the ZC signal, for example as shown in FIG. 1 with reference to the "Bemf comparator" circuit which should be considered as associated with a filtering block.

The technical problem underlying the present invention is that of devising a new method for detecting the angular position of a rotor in an brushless electric motor, having such characteristics as to allow a correct identification of the back electromotive force (Bemf) ZC signal, avoiding the use of analog filters and improving costs and performance of the motor with respect to prior art solutions.

BRIEF SUMMARY OF THE INVENTION

The solution idea underlying an embodiment of the invention is that of analyzing the digital signal produced by the output of the Bemf comparator circuitry and filtering said digital signal, comprising a single bit, through a digital algorithm which is easy to be implemented so as to solve the problem in the cheapest way.

On the basis of such a solution idea, the technical problem is solved by a method of the previously mentioned type.

According to an embodiment of the invention, a method for detecting a rotor position in a brushless electric motor is provided, including detecting a back electromotive force in a winding of the motor, determining a polarity of the back electromotive force, and incrementing a counter up or down according to the polarity of the back electromotive force.

The method may also include repeating the determining and incrementing steps at a selected frequency during a selected time period. A point of zero crossing of the back electromotive force is estimated, and the time period is selected such that the estimated point of zero crossing falls at a midpoint of the time period.

According to an embodiment of the invention, the method, a true point of zero crossing may be established based upon a count of the counter at the end of the selected time period.

According to another embodiment of the invention, the true point of zero crossing is determined for a plurality of selected time periods, and a speed of rotation of the motor may be established based upon a measured time period between two consecutive established true points of zero crossing.

The features and advantages of the process according to the invention will be apparent from the following description of an embodiment thereof given by way of non-limiting example with reference to the attached drawings.

DETAILED DESCRIPTION OF THE INVENTION

As shown in FIG. 1, on going out of the Bemf comparator circuit, a digital signal is produced which indicates whether the Bemf is superior or inferior with respect to a reference signal. Generally, in motors with a star configuration the reference used is the star centre or "Center Tap".

In a classical Brushless motor with three windings a piece of information ZC is given periodically every 60 electrical degrees: obviously, according to the driving strategy, it is not necessary to "listen" to all ZC but such an occurrence can be detected in periods of time which are its multiples (120 degrees, 180, 240 and so on).

The same reasoning can be extended to motors which have a different number of windings. Near the expected ZC the winding of the motor in which such synchronism is to be detected is generally placed at high impedance. From that point, temporal masking is provided to give the current a way to fall to zero. The Bemf comparator will start producing a notable signal which, with no noise on the line, reliably detects the zero crossing (ZC) through the change in state of its output (passage from "1" to "0" or vice-versa).

If just the ZC information is desired, it is possible to start again driving the winding of the motor as soon as such a variation in state has been detected. In this case, the output of the Bemf comparator circuit will no longer be listened to until one arrives near the next expected ZC.

On the other hand, with noise, such a crossing of the reference by the Bemf is not univocal. In fact, near each ZC there are spurious crossings pushing the Bemf comparator to provide multiple transitions '1'-'0' at a single real event.

It is precisely such a signal that must be processed in order to gain the real ZC information.

Advantageously, according to the invention, a digital bi-directional N bit counter is provided, with N being a whole number as desired, capable of counting up and down ("Up/Down counter") according to a signal which indicates its counting direction.

Such a counter is inserted immediately downstream of the Bemf comparator circuit.

According to the needs, one can decide to detect a transition from '0' to '1, for example by increasing the counter in the presence of a value '0' as output of the Bemf comparator and decreasing in the presence of a state '1'.

After a certain period of time the counter will have reached a value proportional to the number of '0' and '1' counted. On the basis of such a value it is possible to process the signal and to get the desired information from it.

It is also possible to obtain from the counter a very precise piece of information ensuring that the counting period is symmetrical ("symmetrical window") around the expected ZC ("expected Bemf ZC"), whose provision can be carried out according to any method of the prior art.

Figure 2A:
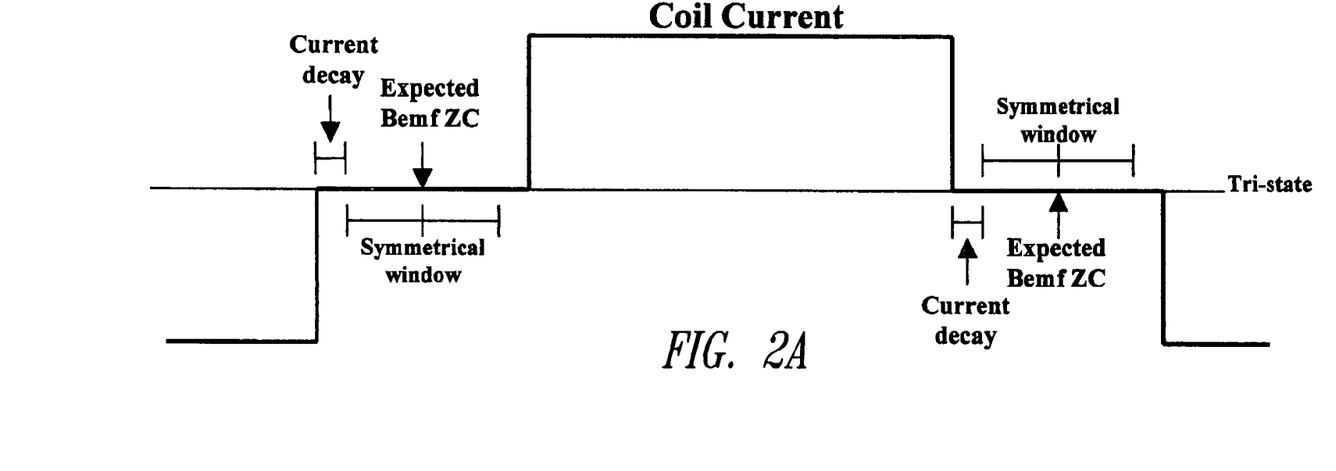
FIGS. 2A and 2B show respective schematic views of two possible examples of implementation of the method according to the invention in a classical 6-stage driving application and in a driving application of the sinusoidal type.
Figure 2B:
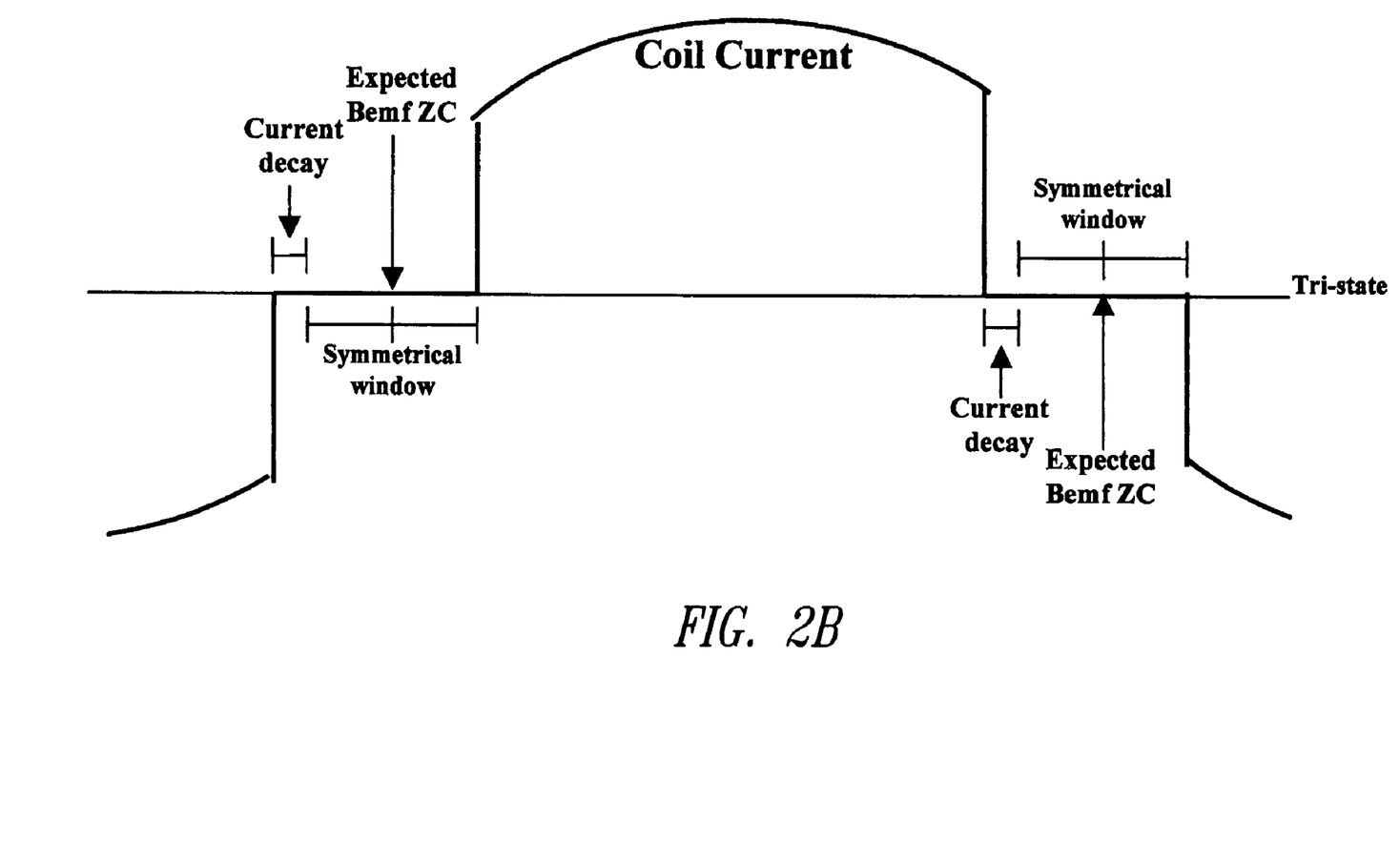

As illustrated in FIG. 2, the method according to the invention can, for example, be applied to the classical 6-stage driving, FIG. 2A, and to driving of the sinusoidal type FIG. 2B.

Figure 3A:
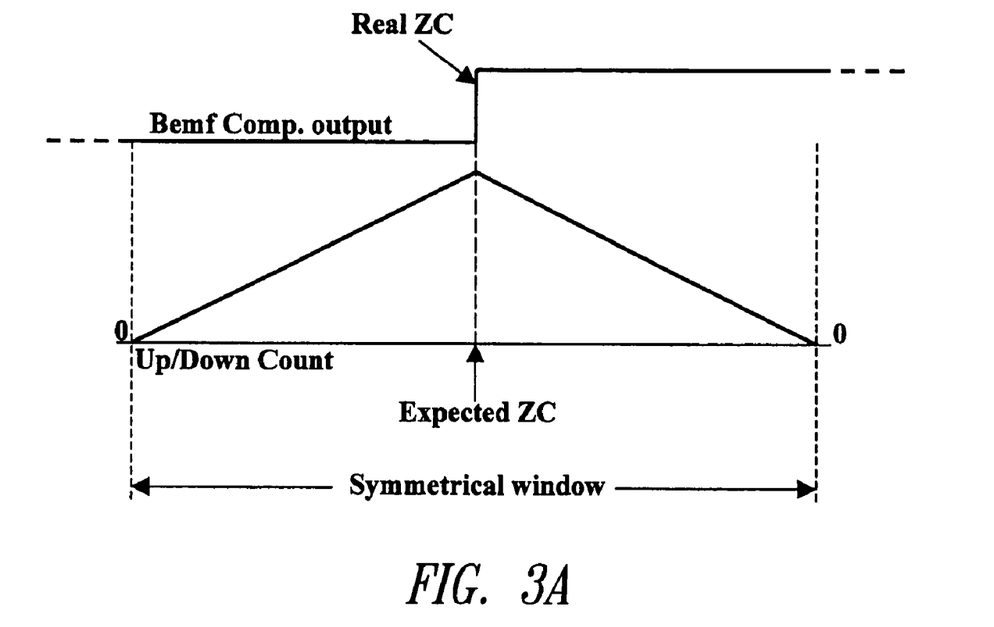
FIGS. 3A, 3B and 3C show respective schematic views of the application of the method according to the invention in case of constant speed of the motor: with no noise, with white noise and with "burst" noise.
Figure 3B:
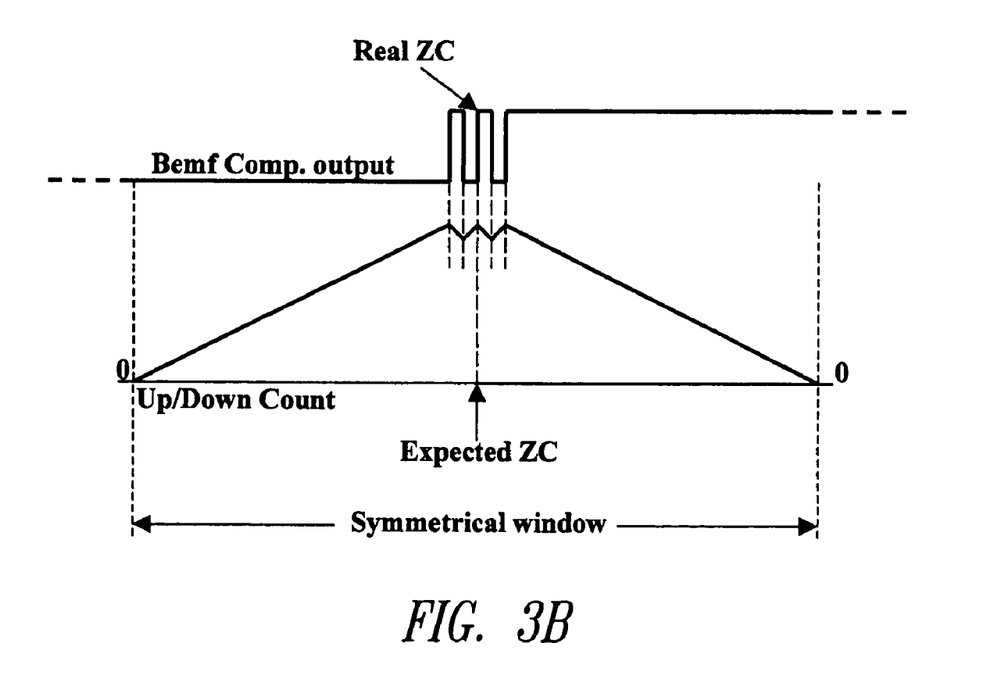
Figure 3C:
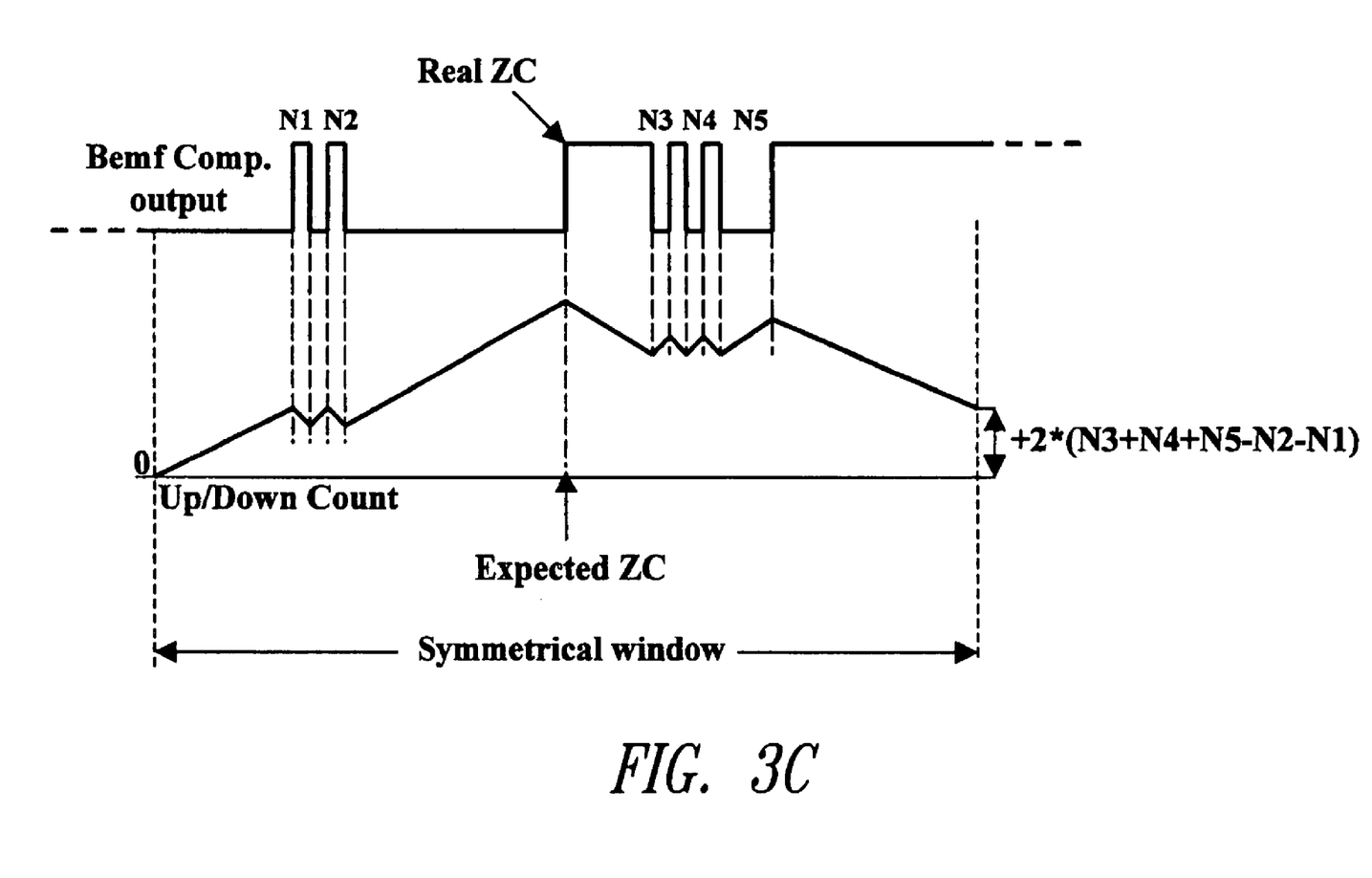
Figure 4A:
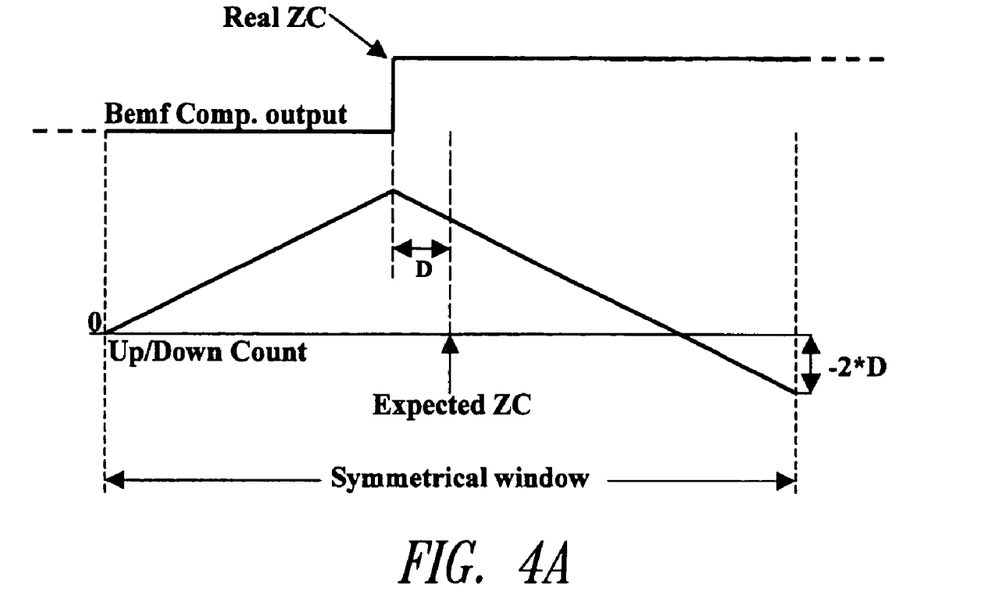
FIGS. 4A, 4B and 4C show respective schematic views of the application of the method according to the invention in case of acceleration of the motor: with no noise, with white noise and with "burst" noise.
Figure 4B:
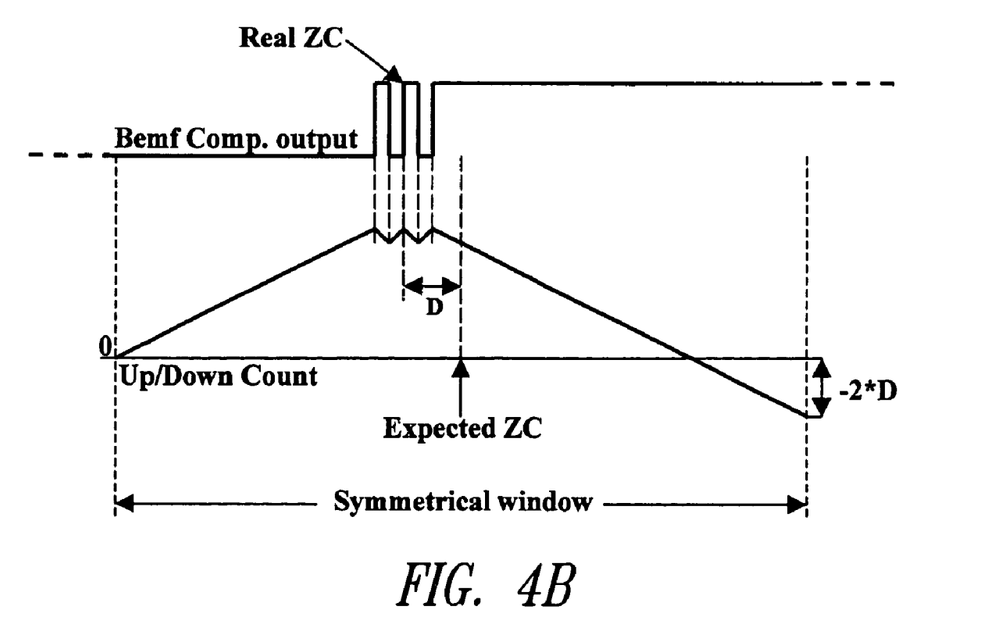
Figure 4C:
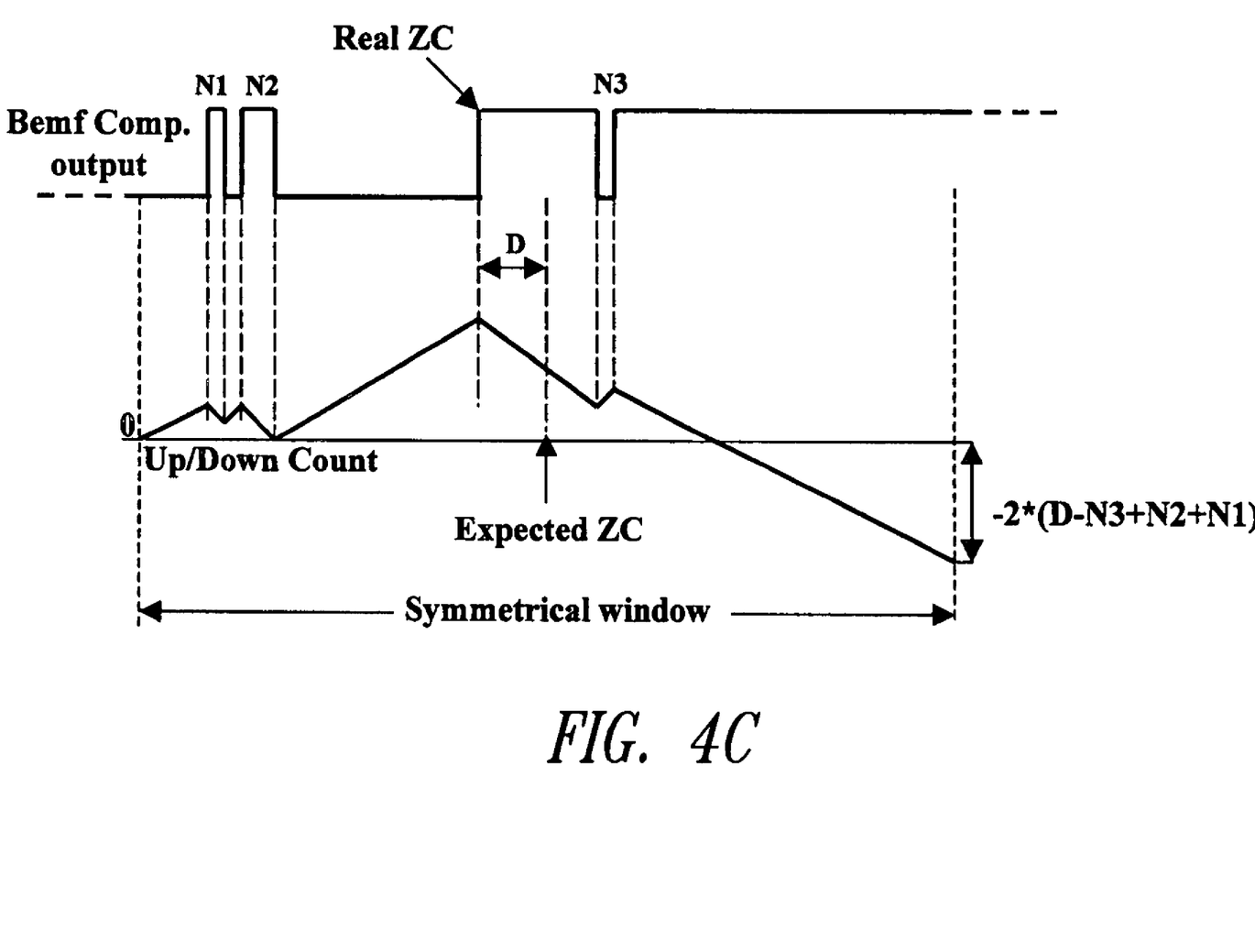

Moreover, during the processing of the method various cases can turn up, including:

1. Motor at constant speed.
   with no noise, at the end of the period the counter will assume zero value. In fact, the ZC will really be where expected, in other words at half the counting period, and the counter will thus have counted as far up as down, as shown in FIG. 3A.
   with white noise over the Bemf, at the end of the period the counter will assume zero value. In fact, ZC will really be where expected, still at half of the counting period, and the noise will have influenced the Bemf comparator in an almost balanced way, as much before as after the actual ZC, as shown in FIG. 3B.
   with periodic "burst" noise, at the end of the period the counter will assume a value proportional to such a disturbance. If the disturbance comes before the expected ZC, the counter will be decreased more than it has been increased, or vice-versa if the noise comes after the expected ZC. Obviously, if there were disturbance both before and after, the counter would reach a value proportional to the difference of the duration of the disturbances detected before and after the centre of the counting period, as shown in FIG. 3C.
2. Motor in acceleration (deceleration).
   without noise, at the end of the period the counter will assume a value proportional to the acceleration (deceleration), thus assuming a negative or positive value. In fact, the real ZC will come sooner or later the expected one and thus the counter will count more in decreasing (increasing) than in increasing (decreasing), as illustrated in FIG. 4A.
   with white noise on the Bemf, at the end of the period the counter will assume a value proportional to the acceleration/deceleration, thus assuming a negative or positive value, respectively. In fact, the real ZC will come sooner or later than the expected one with superposed multiple transitions of state with zero average duration, as illustrated in FIG. 4B.
   with periodic "burst" noise, at the end of the period the counter will-assume a value proportional both to the acceleration/deceleration and to the disturbance, as in FIG. 4C.

In practice, the counter will measure a time period and at the end of said period it will contain the difference between the number of logic states '0' and '1' that have occurred during its input. The base of the times will be determined by the frequency with which the counter will be made to function and this will in turn influence the filtering action.

The counter thus driven has a gain factor 2 caused by the fact that an unexpected state will push the counting to the opposite direction, but at the same time it will prevent the counter from counting towards the expected direction, in other words "Up" before the centre of symmetry and "Down" after such a point.

If for example the temporal window lasted 100 us and the rotor accelerated at 10 us there would be, with no noise, a counting "Up" for 40 us and "Down" for the remaining 60 us which would result in a final value of the counter equal to −20 us.

It should be noted that the counting direction ('0'=increase, '1'=decrease) is purely arbitrary and is used only as an example: the reasoning can be reproduced in the opposite case ('0'=decrease, '1'=increase) without changing its meaning.

Also the fact that in the drawings reference is made just to the case of ZC given by the transition '0'—>'1' is purely an example: obviously, the system operates with the same principle near a ZC given by a transition '1'—>'0'.

Calling "Count" the value that the counter will assume at the end of the counting, it is possible to define:

$$\text{Delta} = \text{Count}/2 \qquad (EQ\ 1)$$

where Delta is no other than the "filtered" value of the real ZC position information with respect to the expected one, in other words with respect to the centre of the temporal "window" in which the counter is active.

Thus the period elapsed from the previous ZC will be given by:

$$\text{Period}(n) = \text{Period}(n-1) + \text{Delta} \qquad (EQ\ 2)$$

where:
"Period(n−1)" is the result of the calculation carried out at the end of the previous window,
Delta is the calculation carried out at the end of the last window according to EQ1; and,
"Period(n)" is the period that separates from the previous ZC calculated at the end of the last counting window.

Due to the fact that in such a way a variation in speed will be noted just when a new ZC is detected, such a calculation would involve the accumulation of a phase error. If, in fact, we assume that there is a decreasing speed step (deceleration step), the period passes from P1 to a longer P2 and there will be the situation represented in FIG. 5.

Figure 5:
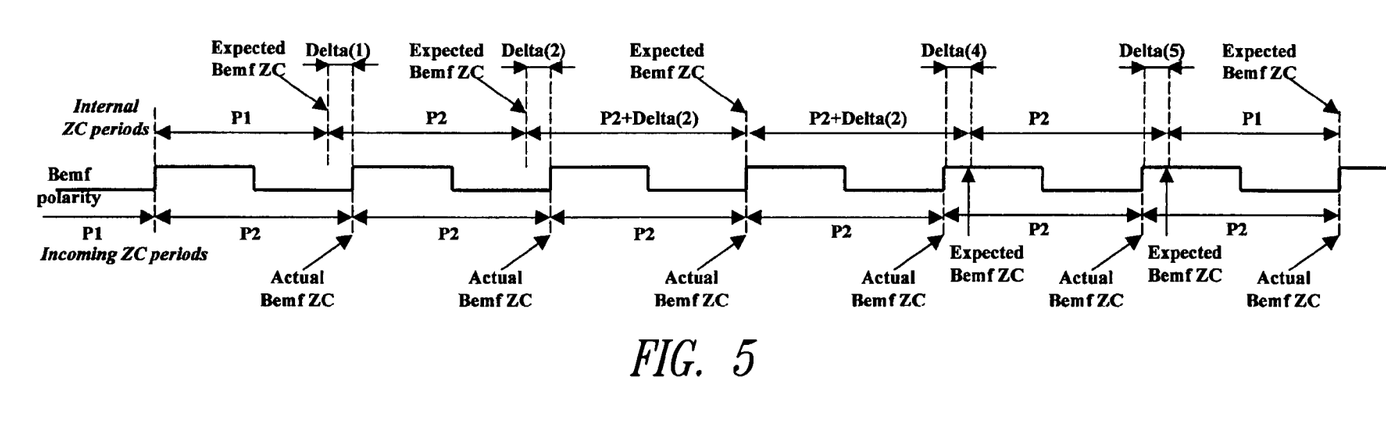
FIG. 5 shows a diagram of an example of the functioning of EQ2 in case of speed step (deceleration)

During the second detection window, the real ZC is late with respect to the expected one, generating a Delta(1) correction equal to P2−P1: therefore the system correctly computes the new speed but this variation is introduced with the delay of one ZC with respect to the real variation thus giving a phase error (equal to Delta(1)).

Due to this offset in the subsequent counting window, Delta(2)(equal to Delta(1) will be detected and an oscillation around the real speed will begin.

To avoid such a phenomenon the period can be corrected as follows:

$$\text{Period}(n)=\text{Period}(n-1)+2\text{Delta}-\text{Delta}(n-1) \quad (EQ\ 3)$$

The new period is thus obtained considering the double of Delta just computed. In this way the phase error is recovered but an actual speed error would be introduced if it were not corrected by the subtraction of the Delta calculated at the previous step (Delta(n−1)).

The signs of the previous equation are simply due to the convention that with an input '0' the counter is increased and that a decrease corresponds to a '1'. Of course, they must be studied according to the actual convention assumed in practice: this does not compromise the generality of the present treatment and the case is not treated since it is an obvious extension of the examples considered.

Figure 6:
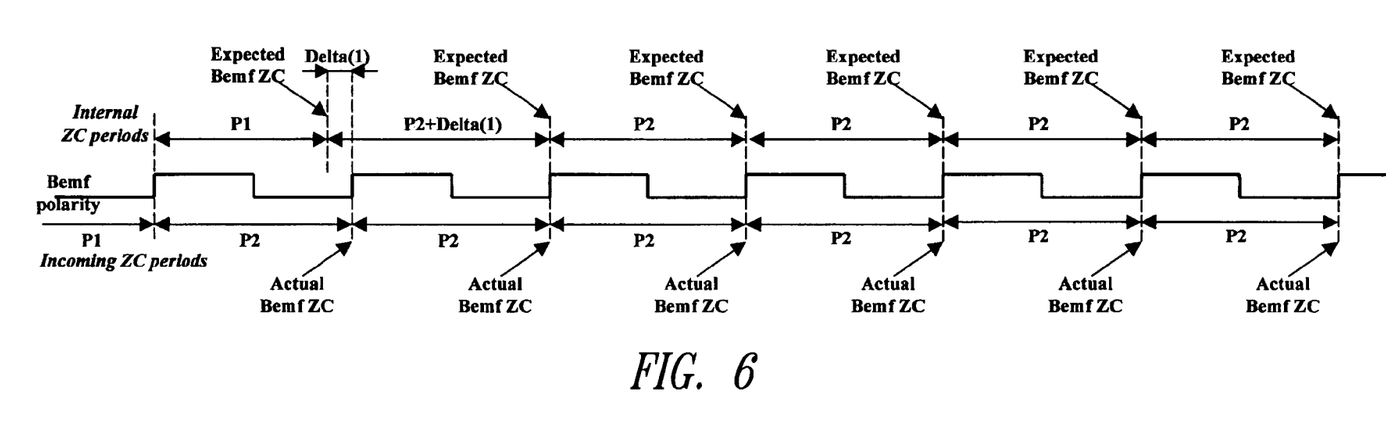
FIG. 6 shows a diagram of an example of the functioning of EQ3 in case of speed step (deceleration)

FIG. 6 illustrates the response to the step of this approach. From this there is an almost instant recovery of the variation in speed of the motor and a correct phase relationship.

Once under steady conditions, such a fast reaction could intensify the impact of possible disturbances on the Bemf line. Such a situation is reduced if a formula of the following type is chosen:

$$\text{Period}(n)=\text{Period}(n-1)+K*\text{Delta}(n-1) \quad (EQ\ 4)$$

where K1 and K2 are generic parameters whose value can be established according to the filtering needs that could also change during the various driving phases: for example a first pair of values [2, 1] could be used during the acceleration phase of the motor and a second pair of values [0.5, 0.25] once a steady speed has been reached.

Figure 7:
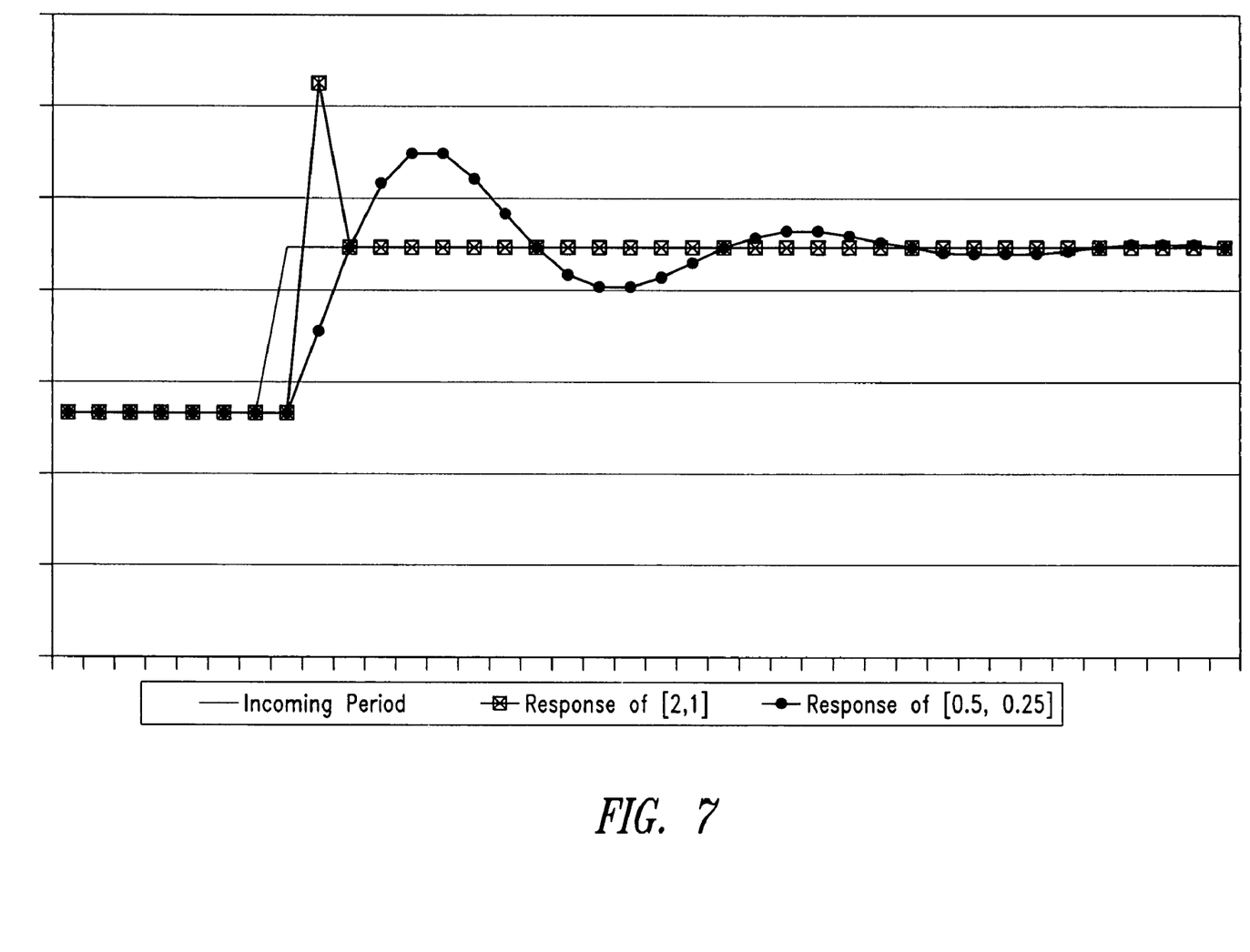
FIG. 7 shows a diagram of an example of response to a speed step of two possible couples of parameters K1 and K2 having the following relationships: (2, 1) and (0.5, 0.25)

FIG. 7 represents the response to the step of two such pairs of values for [K1, K2.

The functioning principle of the system is not altered if other types of filtering are combined with it.

For example, one can periodically mask, and thus prevent counting, also inside the counting zone so as to mask the presence of known noise.

In order to have the lowest impact upon the correct functioning of the filtering allowed by the system for counting "Up/Down", such zones of inhibition of the counting should take place, as much as possible, in pairs, symmetrically around the expected ZC.

Figure 8:
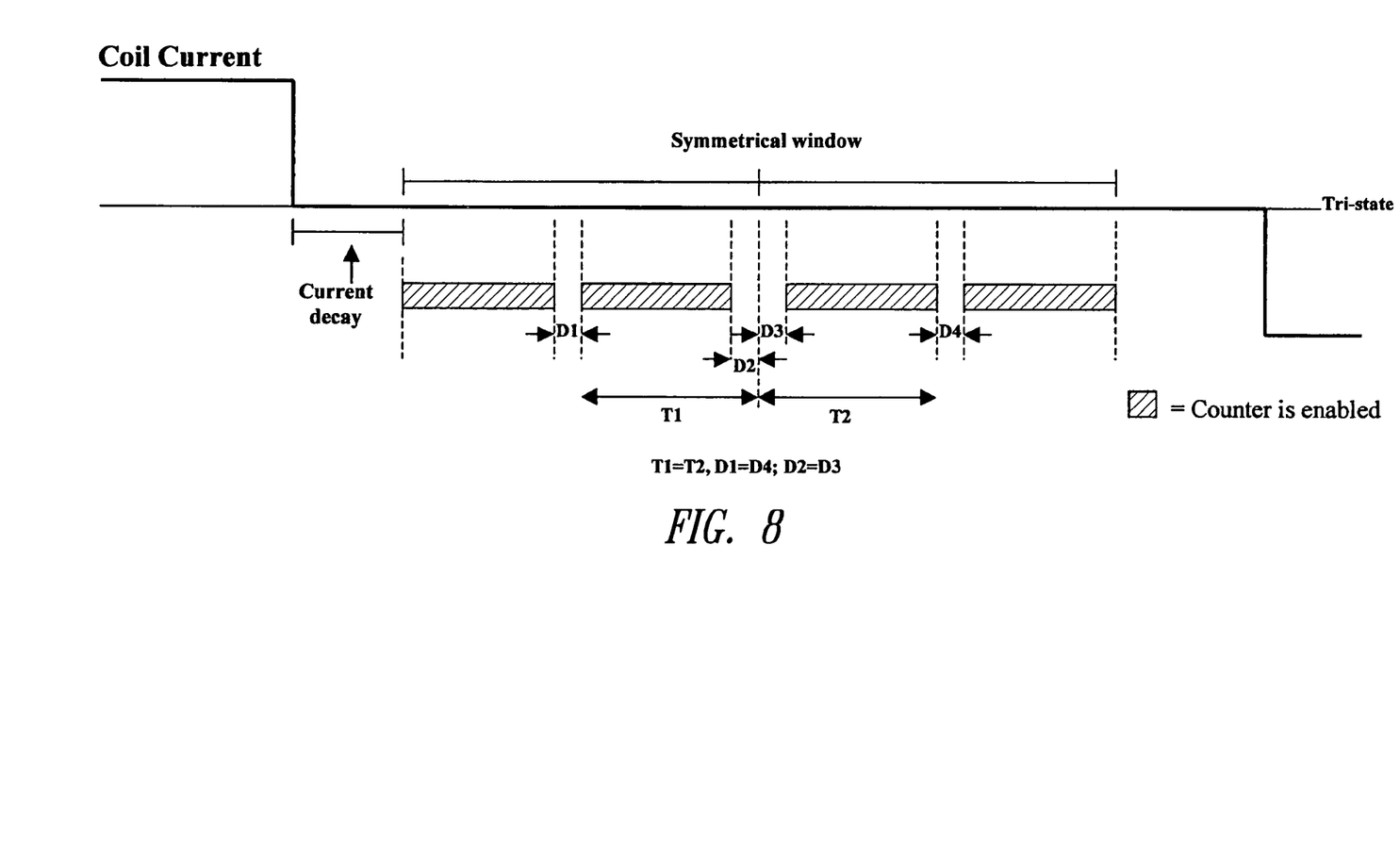
FIG. 8 shows on a diagram a possible extension of the principles of present invention to a case of periodical disconnections of the counter during the counting phase.

The symmetrical pairs should also be, as much as possible, of equal duration. A possible use of such an approach is represented in FIG. 8.

It is worth noting that all the methods described up to now, constituting possible implementations of the principles of the invention, can arbitrarily be alternated with any method of the prior art.

One could, for example, start by detecting the ZCs with a method of the prior art up to a certain speed of rotation of the motor and only then pass to the actuation of the present method.

In practice, the new method does not constrain in any way the freedom of the system in the detection of the ZCs. At each ZC it can be decided whether to act according to the method of the prior art or to adopt the one described here.

The implementation of the equations EQ3 and EQ4 provides the knowledge of the value of some parameters determined by the previous ZC. Such values should be known also at the time in which the method is activated. Since there are no previous ZCs to refer to, suitable values must be established.

In the case of "Delta(n−1)" the zero value could be assigned, whereas for the previous period "Period(n−1)" one could go back to another estimation of the speed of the rotor, or else such a value can come directly from a previous application of a method of the prior art: the moment when the new filtering under consideration is activated, one should already know the aproximate period between two consecutive ZCs of the rotor.

This method can be used in all applications using this type of motor: e.g., Floppy and Hard Disk drive, DVD, CD and Tape drive.

Figure 9:
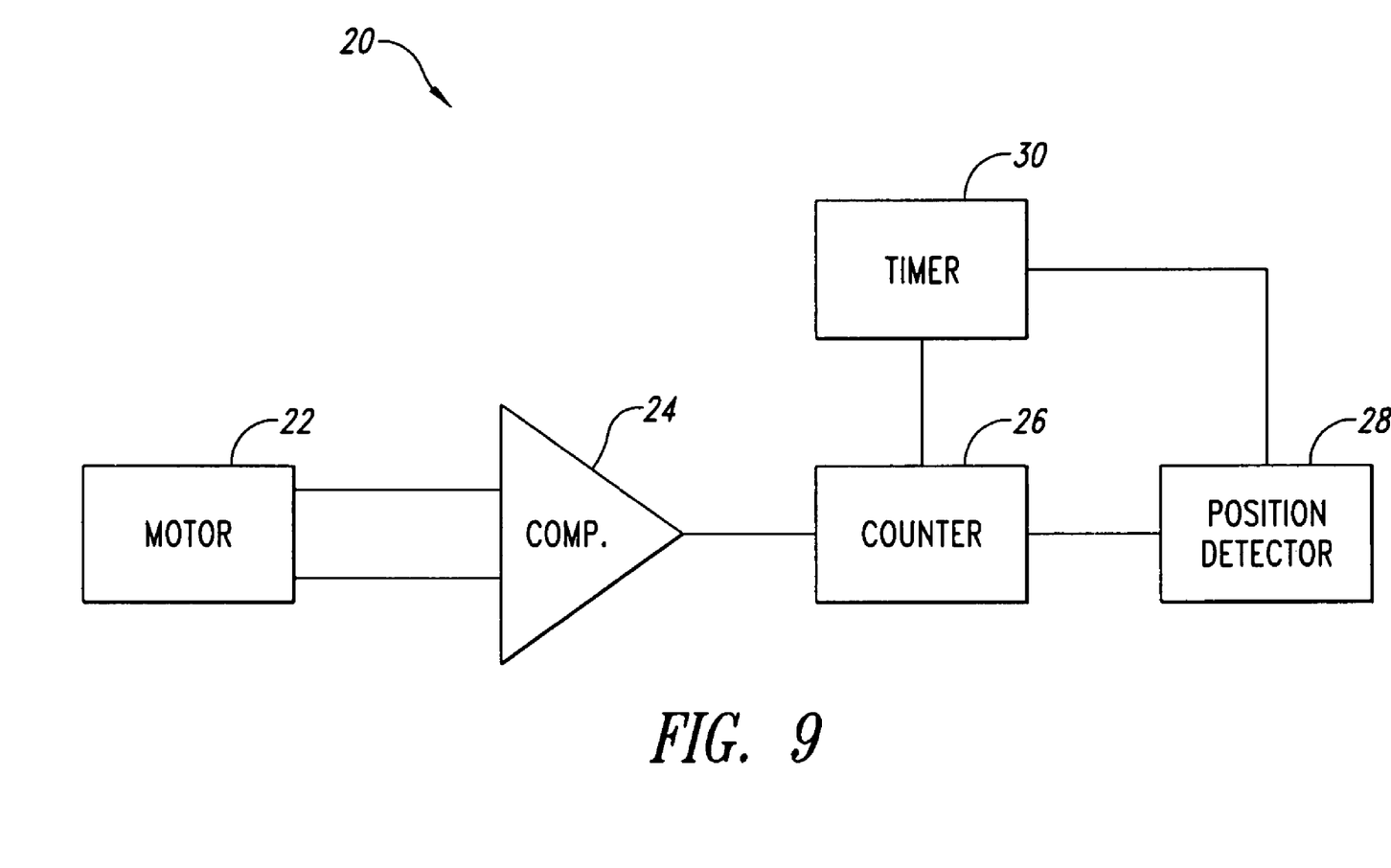
FIG. 9 shows a position detection circuit diagrammatically, according to an embodiment of the invention.

Referring now to FIG. 9, a position detection circuit 20 is illustrated diagrammatically, according to an embodiment of the invention.

A comparator 24 is configured to detect BEMF in a winding of a motor 22, as described with reference to FIG. 1. The comparator 24 provides a digital output signal indicating polarity of the BEMF. A counter circuit 26 is configured to increment up or down, at a selected frequency, according to the value of the digital signal from the comparator 24, and thus, in response to the polarity of the BEMF. The counter circuit 26 is enabled by a timer circuit 30 that enables the counter 26 for a selected time period such that an expected zero crossing of the BEMF occurs at a midpoint of the time period. Based upon the value of the counter 26 at the end of the time period, together with data previously collected, the position detector circuit 28 determines the actual point of zero crossing, and updates the timer circuit 30 accordingly.

It will be recognized that, while the diagram of FIG. 9 is shown having discrete electronic circuits, the functions may be combined into other configurations, or may be wholly or partially performed by software controlled systems.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for detecting the angular position of a brushless electric motor, of the type in which the emission of a polarity signal of the back electromotive force by a detection circuitry associated with the motor is provided, comprising:

detecting a polarity signal of a back electromotive force from a winding of the motor using a detection circuit;

using a bi-directional counter to count a difference in residence time of logic states '0' and '1' at an output of said detection circuitry; and enabling the bi-directional counter around an expected zero-crossing of said back electromotive force with a counting window having an arbitrary duration.

2. A method according to claim 1 wherein said counter is a digital up/down counter.

3. A method according to claim 1 wherein said counting window has an arbitrary duration, symmetrical with respect to the expected zero-crossing.

4. A method according to claim 1, comprising varying the duration of the counting window arbitrarily during driving of the motor.

5. A method according to claim 1, comprising zeroing the counter at a start of each counting window, or at an arbitrary moment before such a time period.

6. A method according to claim 1, comprising periodically disabling the counter from counting inside the counting window.

7. A method according to claim 1, comprising increasing a count of the counter with a reception at an input of the counter of a logic state '0', and decreasing the count of the counter with a reception at the input of a logic state '1' in said counting window.

8. A method according to claim 7, comprising varying a counting frequency of the counter during various driving phases of the motor.

9. A method according to claim 1, comprising using a value assumed by the counter at an end of each counting window in formulas to estimate an instantaneous position of the rotor, a period between two zero-crossings, and a speed of rotation.

10. A method according to claim 9, comprising computing the period between two zero-crossings according to the algorithm $$\text{Period}(n)=\text{Period}(n-1)+K1*\text{Delta}(n-1)$$

where:
"Period(n−1)" results from a calculation carried out at an end of a previous window,
Delta is the calculation carried out at the end of the last window and is a filtered value of position information of a real zero-crossing with respect to an expected zero crossing at the base;
"Period(n)" is the period which separates from a previous zero-crossings calculated at the end of the last counting window; and
K1 and K2 are generic parameters whose value can be established according to filtering requirements.

11. A method according to claim 10, comprising modifying values of the generic parameters arbitrarily during various driving phases of the motor.

12. A method according to claim 10, comprising arbitrarily alternating the algorithm with any known method for detecting the position of the rotor.

13. A method for detecting a rotor position in a brushless electric motor, comprising:
detecting a back electromotive force in a winding of the motor;
determining a polarity of the back electromotive force;
incrementing a counter up or down according to the polarity of the back electromotive force;
repeating the determining and incrementing steps at a selected frequency during a selected time period; and
establishing a true point of zero crossing based upon a count of the counter at the end of the selected time period.

14. A method for detecting a rotor position in a brushless electric motor, comprising:
detecting a back electromotive force in a winding of the motor;
estimating a point of zero crossing of the back electromotive force;
determining a polarity of the back electromotive force;
incrementing a counter up or down according to the polarity of the back electromotive force; and
repeating the determining and incrementing steps at a selected frequency during a selected time period.

15. The method of claim 14, further comprising selecting the selected time period such that the estimated point of zero crossing falls at a midpoint of the selected time period.

16. The method of claim 13 wherein:
the selected time period is one of a plurality of selected time periods; and
the method further comprises performing the detecting, determining, incrementing, and repeating steps during each of the plurality of selected time periods.

17. The method of claim 16, further comprising zeroing the counter prior to a beginning of each of the plurality of the selected time periods.

18. The method of claim 16, further comprising establishing a speed of rotation of the motor based upon a measured time period between two consecutive established true points of zero crossing.

19. A method, comprising:
estimating a point of zero crossing of a back electromotive force of a winding of a motor;
establishing a time period beginning a first selected period prior to the estimated zero crossing, and ending a second selected period after the estimated zero crossing, the first and second selected periods being equal;
incrementing a counter repeatedly at a selected frequency during the time period;
determining, at each increment of the counter, a polarity of the back electromotive force;
incrementing the counter in a first direction if the polarity of the back electromotive force is positive;
incrementing the counter in a second direction if the polarity of the back electromotive force is negative; and
establishing a true point of zero crossing based upon a value of the counter at the end of the time period.

20. A system, comprising:
a comparator module configured to detect a back electromotive force in a motor winding and supply a digital signal at an output based upon a polarity of the detected back electromotive force;
a counter module configured to increment up or down at a selected frequency according to a digital value at the output of the comparator module;
a position detector module configured to estimate a point of zero crossing of the back electromotive force, and to determine a true position of a rotor of the motor based upon a count of the counter module at an end of a selected time period; and
an enable module configured to select the time period such that the estimated zero crossing occurs at a midpoint of the time period, and to enable the counter module during the selected time period.

21. The system of claim 20 wherein the position detector module is further configured to determine a true point of zero crossing based upon a count of the counter module at an end of a selected time period.

22. The method of claim 19, comprising determining a speed of rotation of a rotor of the motor based upon a period between the true point of zero crossing and an additional true point of zero crossing.

23. A method for detecting the angular position of a brushless electric motor, comprising:
- detecting a polarity signal of a back electromotive force from a winding of the motor, using a detection circuit;
- using a bi-directional counter to count a difference in residence time of logic states '0' and '1' at an output of said detection circuitry during counting windows; and
- zeroing the counter at a start of each counting window, or at an arbitrary moment before such a time period.

24. The method of claim 22, comprising determining a true zero crossing based on a count of the bi-directional counter at an end of the counting window.

25. The method of claim 23, comprising determining a rotation speed of the rotor based on a period between two true zero crossings.

26. A method for detecting the angular postion of a brushless electric motor, comprising:
- detecting a polarity signal of a back electromotive force from a winding of the motor using a detection circuit;
- using a bi-directional counter to count a difference in residence time of logic states '0' and '1' at an output of said detection circuitry during counting windows;
- varying a counting frequency of the counter during various driving phases of the motor; and
- zeroing the counter at a start of each counting window, or at an arbitrary moment before such a time period.

27. A method for detecting the angular postion of a brushless electric motor, comprising:
- detecting a polarity signal of a back electromotive force from a winding of the motor using a detection circuit;
- using a bi-directional counter to count a difference in residence time of logic states '0' and '1' at an output of said detection circuitry during each of succession of counting windows;
- using a value assumed by the counter at an end of each counting window in formulas to estimate an instantaneous position of the rotor, a period between two zero-crossings, and a speed of rotation;
- estimating a zero crossing based on previously determined zero crossings; and
- establishing a counting window such that the estimated zero crossing is at a midpoint of the counting window.

28. A method for detecting the angular position of a brushless electric motor, comprising:
- detecting a polarity signal of a back electromotive force from a winding of the motor using a detection circuit;
- using a bi-directional counter to count a difference in residence time of logic states '0' and '1' at an output of said detection circuitry during each of a succession of counting windows; and
- computing a period between two zero-crossings according to the algorithm $$Period(n) = Period(n-1) + K1 * Delta(n-1)$$

where:
- "Period(n−1)" results from a calculation carried out at an end of a previous window,
- Delta is the calculation carried out at the end of the previous window and is a filtered value of position information of a real zero-crossing with respect to the expected zero crossing at the base;
- "Period(n)" is the period which separates one zero crossing from a previous zero-crossing calculated at the end of a previous counting window; and
- K1 and K2 are generic parameters whose value can be established according to filtering requirements.

29. The method of claim 28, comprising establishing a real zero crossing based on a count of the counter at the end of each counting window.

* * * * *